Patented Dec. 4, 1945

2,390,185

UNITED STATES PATENT OFFICE 2,390,185

PRODUCTION OF MIXED ORGANIC ESTERS OF CELLULOSE

George W. Seymour and Blanche B. White, Cumberland, Md., assignors to Celanese Corporation of America, a corporation of Delaware No Drawing. Application November 19, 1943, Serial No. 510,920

6 Claims. (Cl. 260—225)

This invention relates to the preparation of mixed organic esters of cellulose and relates more particularly to the preparation of mixed organic esters of cellulose containing the radicals of both lower and higher aliphatic acids.

An object of this invention is to provide an improved process for the preparation of mixed organic esters of cellulose containing the radicals of both higher and lower aliphatic acids.

Another object of this invention is the preparation of mixed organic esters of cellulose of wide solubility range without subjecting said esters to ripening procedures.

A further object of this invention is the preparation of cellulose acetate-stearates of relatively high stearyl values and of wide solubility.

Other objects of this invention will appear from the following detailed description.

In the preparation of mixed organic esters of cellulose containing the radicals of both higher and lower aliphatic acids, such as cellulose acetate-stearate, for example, the cellulose employed is usually acetylated, ripened or hydrolyzed to reduce the acyl value and to free hydroxyl groups for further esterification, and then stearylated with a suitable stearylating agent. Such a process, involving the initial hydrolysis of the cellulose acetate prior to further esterification involves additional steps in the process and is, of course, uneconomic.

We have now discovered that mixed organic esters of cellulose containing any desired proportion of the radicals of both higher and lower aliphatic acids may be prepared in a relatively simple and economic manner without the necessity of ripening the cellulose esters produced at any stage in their preparation. In accordance with our novel process, we esterify cellulose directly with an acylating agent comprising the acid chloride of a relatively long chain aliphatic acid in a liquid medium comprising an acid-binding base adapted to neutralize the hydrochloric acid produced by the esterification and, preferably, also containing an inert diluent. After the desired degree of esterification is achieved, the cellulose ester formed is removed from the initial esterification bath, washed, dried and then suspended in a suitable organic liquid and esterified further with an esterifying agent comprising the acid anhydride of a lower aliphatic acid together with an acid esterification catalyst.

While our invention will be more particularly described in connection with the preparation of cellulose acetate-stearate, it will be understood, of course, that other mixed organic esters of cellulose may also be prepared in like manner, employing suitable esterifying agents. Examples of other mixed organic esters of cellulose which may be prepared in accordance with our novel process are cellulose acetate-palmitate, cellulose acetate-oleate, and cellulose acetate-linoleate as well as cellulose propionate-stearate, cellulose propionate-oleate, cellulose propionate-linoleate, cellulose butyrate-stearate, cellulose butyrate-oleate and cellulose butyrate-linoleate.

Thus, in the preparation of cellulose acetate-stearate, the cellulose, with or without a pretreatment designed to render the cellulose more reactive, is immersed in a liquid medium comprising from 1 to 12 parts by weight of benzene as the inert diluent, from 1 to 10 parts by weight of pyridine as the acid-binding agent and from 1½ to 10 parts by weight of stearyl chloride as the stearylating agent. The temperature of the medium is maintained at from 25 to 60° C. and the esterification is continued for from 3 to 24 hours. The degree of stearylation may be effectively controlled by varying the quantity of stearyl chloride employed or by adjusting the conditions of time and temperature and continuing the stearylation until the desired degree of stearylation is effected. The degree of stearylation of the cellulose which may be effected in the initial stearylation may be such that the cellulose stearate contains from 20% to 70% of stearic acid, or more. In lieu of pyridine, other acid-binding bases which may be suitably employed to combine with the hydrochloric acid produced during the stearylation are, for example, alpha-picoline, beta-picoline, quinoline or iso-quinoline. At the completion of the initial stearylation reaction, the cellulose stearate is removed from the bath, washed with a suitable organic solvent, such as ethyl alcohol, to remove excess stearyl chloride, after which the cellulose stearate is dried.

The acetylation of the cellulose stearate is then effected, preferably, with acetic anhydride as the acetylating agent and employing sulfuric acid or other suitable acid, i. e. phosphoric acid, perchloric acid, or the like, as the esterification catalyst. Advantageously, a small quantity of acetic acid may also be employed during the acetylation to act as a swelling agent for the cellulose stearate and the acetylation is carried out in a liquid medium which is a suitable solvent for the final product, e. g. benzene or the like. Thus, about one part by weight of cellulose stearate may be suspended in 3 to 6 parts by weight of benzene containing up to 3 parts acetic acid, as the solvent medium, and from 1½ to 4 parts by weight of acetic anhydride, containing 2 to 12% by weight, on the cellulose stearate, of sulfuric acid as added thereto. The temperature of the reaction mixture is maintained at 25 to 30° C. for 16 to 72 hours and the cellulose acetate-stearate which forms gradually dissolves in the benzene comprising the esterification bath. The cellulose acetate stearate may then be precipitated from solution by the addition of alcohol or aqueous alcohol thereto and may then be washed with alcohol and water and dried.

In accordance with our process, cellulose acetate-stearates may be prepared which are fully esterified and which do not have any free hydroxyl groups, or the cellulose acetate-stearate produced may contain from about 0.40 to 0.62 free hydroxyl groups for each cellulose molecule. The latter esters, which still contain some free hydroxyl groups are, of course, prepared directly by our novel process and without resort to any ripening processes whatever.

In order further to illustrate our invention but without being limited thereto the following examples are given.

Example I 100 parts by weight of cellulose in the form of cotton linters are entered into a bath comprising 352 parts by weight of benzene and 395 parts by weight of pyridine containing 360 parts by weight of stearyl chloride at 60 to 70° C. and maintained therein for four hours. The cellulose is stearylated by this treatment and a product having a stearyl value of 57.5%, calculated as stearic acid, is obtained. The product is separated from the stearylating bath, washed with hot alcohol to remove excess stearyl chloride and is then dried. 220 parts by weight of cellulose stearate are obtained. 100 parts by weight of dried cellulose stearate are acetylated in a bath comprising 440 parts by weight of benzene, 105 parts by weight of acetic acid, 268 parts by weight of acetic anhydride and 10 parts by weight, or 10% on the weight of the cellulose stearate, of sulfuric acid as esterification catalyst. The acetylation bath is maintained at 25 to 30° C. and the reaction allowed to proceed for 15½ hours, the cellulose acetate-stearate formed gradually dissolving in the acetylating bath to form a clear solution. The cellulose acetate-stearate is separated from solution by addition of alcohol and is washed and dried. The cellulose acetate-stearate obtained has an acetyl value of 27.1% and a stearyl value of 43%, calculated as the corresponding acids. The cellulose acetate-stearate is not fully esterified by this procedure and still retains some free, unesterified hydroxyl groups.

Example II 100 parts by weight of cellulose are stearylated employing a bath comprising 720 parts by weight of stearyl chloride, 1055 parts by weight of benzene and 790 parts by weight of pyridine. The cellulose is entered into the bath, which is at a temperature of 60 to 70° C., and is maintained there for 3 hours. The cellulose stearate formed remains in suspension and, after the esterification is completed, the cellulose stearate is separated from the esterification bath, washed with hot ethyl alcohol to free it of excess stearyl chloride and then dried. The cellulose ester obtained, comprising 330 parts by weight, has a stearyl value of 74.1%, calculated as stearic acid. 100 parts by weight of the dried cellulose stearate are then acetylated employing an acetylating bath comprising 107 parts by weight of acetic anhydride, 105 parts by weight of acetic acid, 527.4 parts by weight of benzene and 5 parts by weight, comprising 5% on the weight of the cellulose stearate, of sulfuric acid as esterification catalyst. The acetylation bath is held at a temperature of 25 to 30° C. and the acetylation is continued for 16 hours, the cellulose acetate-stearate formed gradually dissolving in the bath until a clear solution is obtained at the completion of the acetylation. The cellulose acetate-stearate is separated from solution by addition of alcohol and is washed and dried. The mixed ester obtained has an acetyl value of 10.8% and a stearyl value of 70.2%, each calculated as the corresponding acid and contains some free hydroxy groups.

Example III 100 parts by weight of cellulose are stearylated employing a bath comprised of 320 parts by weight of stearyl chloride, 535 parts by weight of benzene and 345 parts by weight of pyridine. The cellulose is introduced into the bath which is at a temperature of 60 to 70° and is maintained there for 6 hours. The cellulose stearate formed remains in suspension, and, after the esterification is completed, the cellulose stearate is separated from the esterification bath, washed with hot ethyl alcohol to free it from excess stearyl chloride and then dried. A product having a stearyl value of 20.0%, calculated as stearic acid, is obtained. 100 parts by weight of the dried cellulose stearate are acetylated in a bath comprised of 275 parts by weight of benzene, 315 parts by weight acetic acid, 150 parts by weight acetic anhydride and 10 parts by weight or, 10% on the weight of cellulose stearate, of sulfuric acid, as esterification catalyst. The acetylation bath is maintained at 25 to 30° C. for 24 hours, the cellulose acetate-stearate formed dissolving in the acetylation bath to form a clear solution. The cellulose stearate is separated from the solution by addition of alcohol, and has an acetyl value of 50.0% and a stearyl value of 16.8%, calculated as the corresponding acids. The cellulose acetate is fully esterified and contains no free hydroxyl groups.

It is to be understood that the foregoing detailed description is merely given by way of illustration and that many variations may be made therein without departing from the spirit of our invention.

Having described our invention, what we desire to secure by Letters Patent is:

1. Process for the production of cellulose acetate-stearate, which comprises esterifying cellulose with stearyl chloride in a liquid medium containing pyridine, separating the cellulose stearate formed from the liquid medium, washing the cellulose stearate to remove excess stearyl chloride and drying it, and further esterifying the cellulose stearate with acetic acid anhydride and an esterification catalyst in suspension in a liquid medium comprising acetic acid and benzene which is a solvent for the cellulose acetate-stearate formed.

2. Process for the production of cellulose acetate-stearate, which comprises esterifying cellulose in a liquid medium containing pyridine and from 1.5 to 10 parts by weight of stearyl chloride per part of cellulose, maintaining the temperature of the reaction medium at from 25 to 60° C. for 3 to 24 hours, separating the cellulose stearate formed from the liquid medium, washing the cellulose stearate to remove excess stearyl chloride and drying it, and further esterifying the cellulose stearate in a liquid medium comprising acetic acid anhydride, an esterification catalyst, acetic acid and benzene, which liquid medium after the esterification is a solvent for the cellulose acetate-stearate formed.

3. Process for the production of cellulose acetate-stearate, which comprises esterifying cellulose in a liquid medium containing pyridine and from 1.5 to 10 parts by weight of stearyl chloride per part of cellulose, maintaining the temperature of the reaction medium at from 25 to 60° C. for 3 to 24 hours, separating the cellulose stearate formed from the liquid medium, washing the cellulose stearate to remove excess stearyl chloride and drying it, and further esterifying the cellulose stearate in a liquid medium comprising from 1.5 to 4 parts by weight of acetic acid anhydride, an esterification catalyst, up to 3 parts by weight of acetic acid and from 3 to 6 parts by weight of benzene.

4. Process for the production of cellulose acetate-stearate, which comprises esterifying cellulose in a liquid medium containing pyridine and from 1.5 to 10 parts by weight of stearyl chloride per part of cellulose, maintaining the temperature of the reaction medium at from 25 to 60° C. for 3 to 24 hours, separating the cellulose stearate formed from the liquid medium, washing the cellulose stearate to remove excess stearyl chloride and drying it, and further esterifying the cellulose stearate in a liquid medium comprising from 1.5 to 4 parts by weight of acetic acid anhydride, an esterification catalyst, up to 3 parts by weight of acetic acid and from 3 to 6 parts by weight of benzene maintained at from 25 to 30° C. for 16 to 72 hours.

5. Process for the production of cellulose acetate-stearate, which comprises esterifying cellulose in a liquid medium containing pyridine and from 1.5 to 10 parts by weight of stearyl chloride per part of cellulose, maintaining the temperature of the reaction medium at from 25 to 60° C. for 3 to 24 hours, separating the cellulose stearate formed from the liquid medium, washing the cellulose stearate to remove excess stearyl chloride and drying it, and further esterifying the cellulose stearate in a liquid medium comprising from 1.5 to 4 parts by weight of acetic acid anhydride, and esterification catalyst, up to 3 parts by weight of acetic acid and from 3 to 6 parts by weight of benzene maintained at from 25 to 30° C. for 16 to 72 hours, and precipitating the cellulose acetate-stearate formed from solution.

6. Process for the production of cellulose acetate-stearate, which comprises esterifying one part by weight of cellulose in a liquid medium containing pyridine and from 1.5 to 10 parts by weight of stearyl chloride, maintaining the temperature of the reaction medium at from 25 to 60° C. for 3 to 24 hours, separating the cellulose stearate formed from the liquid medium, washing the cellulose stearate to remove excess stearyl chloride and drying it, and further esterifying the cellulose stearate in a liquid medium comprising from 1.5 to 4 parts by weight of acetic acid anhydride, from 2 to 12 parts by weight of sulfuric acid, up to 3 parts by weight of acetic acid and from 3 to 6 parts by weight of benzene maintained at from 25 to 30° C. for 16 to 72 hours, and precipitating the cellulose acetate-stearate formed from solution.

GEORGE W. SEYMOUR.
BLANCHE B. WHITE.